United States Patent
Nidd et al.

(10) Patent No.: US 9,986,030 B2
(45) Date of Patent: May 29, 2018

(54) METHOD AND DEVICE FOR DUPLICATING A DATA CENTER

(71) Applicant: International Business Machines Corporation, Armonk, NY (US)

(72) Inventors: Michael E. Nidd, Rueschlikon (CH); Birgit M. Pfitzmann, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 14/682,595

(22) Filed: Apr. 9, 2015

(65) Prior Publication Data

US 2015/0312338 A1    Oct. 29, 2015

(30) Foreign Application Priority Data

Apr. 25, 2014    (GB) .................................. 1407304.3

(51) Int. Cl.
*H04L 12/24*    (2006.01)
*H04L 29/08*    (2006.01)
*H04L 29/12*    (2006.01)

(52) U.S. Cl.
CPC ...... *H04L 67/1095* (2013.01); *H04L 61/2521* (2013.01); *H04L 61/1511* (2013.01); *H04L 61/2007* (2013.01)

(58) Field of Classification Search
CPC ............. H04L 67/1095; H04L 61/2521; H04L 61/1511; H04L 61/2007
USPC ....................................................... 709/223
See application file for complete search history.

(56) References Cited

U.S. PATENT DOCUMENTS

| | | | |
|---|---|---|---|
| 8,243,589 B1 | 8/2012 | Trost et al. | |
| 8,701,103 B1 | 4/2014 | Hsu et al. | |
| 8,996,691 B1* | 3/2015 | Stickle | H04L 12/40071 709/224 |
| 9,515,987 B2 | 12/2016 | Kang et al. | |
| 9,614,748 B1 | 4/2017 | Battersby et al. | |
| 2002/0129134 A1* | 9/2002 | Leighton | H04L 12/2697 709/223 |
| 2006/0036761 A1 | 2/2006 | Amra et al. | |
| 2007/0061465 A1 | 3/2007 | Kim et al. | |
| 2010/0250718 A1 | 9/2010 | Igarashi et al. | |
| 2011/0314155 A1* | 12/2011 | Narayanaswamy | G06F 9/4856 709/226 |

(Continued)

FOREIGN PATENT DOCUMENTS

| WO | WO2012/087941 A1 | 6/2012 |
|---|---|---|
| WO | WO2014/123831 A1 | 8/2014 |

*Primary Examiner* — El Hadji Sall
*Assistant Examiner* — Elizabeth Kassa
(74) *Attorney, Agent, or Firm* — Scully, Scott, Murphy & Presser, P.C.; David Quinn, Esq.

(57) ABSTRACT

A method and a device for duplicating a data center having an original public address space and an original private address space are proposed. The method comprises the steps of copying the data center for providing at least two copied data centers; to each of the copied data centers, allocating a new public address space and the original private address space of the data center; and providing an address translation component which is configured to re-address traffic such that traffic directed to an address of the original public address space is directed to a corresponding address of one of the new public address spaces of the copied data centers.

10 Claims, 5 Drawing Sheets

(56) References Cited

U.S. PATENT DOCUMENTS

| | | | |
|---|---|---|---|
| 2012/0284364 A1* | 11/2012 | Paunikar | H04L 29/12367 709/217 |
| 2013/0148665 A1* | 6/2013 | Ludwig | H04L 12/1485 370/392 |
| 2013/0185404 A1 | 7/2013 | Patel et al. | |
| 2014/0013403 A1* | 1/2014 | Shuster | G06F 17/30867 726/4 |
| 2015/0256508 A1* | 9/2015 | Townsend | H04L 61/20 709/245 |

* cited by examiner

METHOD AND DEVICE FOR DUPLICATING A DATA CENTER

CROSS-REFERENCE TO RELATED APPLICATIONS

This application is based on and claims the benefit of priority from commonly-owned United Kingdom Patent Application 1407304.3, filed on Apr. 25, 2014.

FIELD OF THE INVENTION

The present invention relates to a method and to a device for duplicating a data center having an original public address space and an original private address space. Moreover, the present invention relates to a system including a plurality of copied data centers and an address translation component.

BACKGROUND

For example, duplicating a data center may be used in a case that an enterprise having one data center may be split up into multiple enterprises addressing the same business, e.g. for regulatory reasons or anti-trust reasons or expansion to a new geography. In consequence, large parts of the enterprise's infrastructure, including the enterprise's data center and the services it provides, are to be duplicated.

Conventional industry tools in data center relocation relate to data center relocation (i.e. simple move) rather than data center duplication. In doing so, all Internet Protocol (IP) addresses are usually retained in the old enterprise part, and new IP addresses are chosen for the new part.

As a result, the new enterprise part and its business partners have to change all address configurations in client settings, server settings, middleware configurations (multiple per middleware), and directly in code, at once—which is a huge effort and not likely to cover all address configurations at once. Accordingly, old addresses still being used have to be dealt with.

Techniques for network replication are described in WO2012/087941A1 and U.S. Pat. No. 6,493,340A. Moreover, JP2011/1191975A describes a computer function verification method. Conventional techniques for network splitting are described in US2013/0003582A1, WO2012/146103A1 and U.S. Pat. No. 8,284,743B2.

Accordingly, it is an aspect of the present invention to improve duplicating a data center having an original public address space and an original private address space

BRIEF SUMMARY OF THE INVENTION

According to a first aspect, a method for duplicating a data center having an original public address space and an original private address space is proposed. The method includes the following steps: In a first step, the data center is copied for providing at least two copied data centers. In a second step, a new public address space and the original private address space of the data center are allocated to each of the copied data centers. In a third step, an address translation component is provided which is configured to re-address traffic such that traffic directed to an address of the original public address space is directed to a corresponding address of one of the new public address spaces of the copied data centers.

Advantageously, the above-described method ensures service continuity against backdrop of significant infrastructural changes by minimizing downtime and minimizing risk to service availability while the data center is being duplicated, minimizing cost of data center duplication, as well as maximizing the quality of data center duplication.

Advantageously, assigning public address spaces for each copied data center that are new, i.e. distinguishable from the public address space of the original data center, as well as different, i.e. distinguishable from each other, minimizes the overall configuration effort for data center duplication, as only minimal reconfiguration is needed to introduce the new address spaces. Further, safe landing points are created for traffic directed to new addresses right from the start of duplication.

Advantageously, re-using the data center's private address space in the copied data centers minimizes the overall configuration effort for data center duplication even more, since no reconfiguration is required for traffic directed to addresses of the private address space.

Advantageously, preserving the original public address space in the data center minimizes the overall configuration effort for data center duplication even further, as no address reconfiguration is needed in the data center. Moreover, a safe landing point is established for traffic (still) directed to addresses from the original public address space right from the start of duplication. This in turn enables logging and/or localization of remaining misconfigurations, as well as providing a starting point for permanent traffic hand-off to the copied data centers.

In particular, the term 'original' may denote a configuration state before data center duplication takes place, whereas the term 'new' may stand for a configuration state that differs from the original state.

Particularly, an address space may either stand for a network address space (i.e. contiguous range of numerical labels) or for a domain name space (i.e. human-readable name) assigned to a communication network to have its networking devices identified and localized which provide communication services (e.g. connectivity, content etc.). In particular, a private address space may be an address space used to provide private communication services (i.e. communication services to a closed user group) within the organization to which the computer network belongs, and a public address space may refer to an address space used to provide public communication services within and potentially also beyond the organization's network boundaries.

In particular, address translation may refer to re-labeling the destination address section of protocol data units with a new address relevant for the particular protocol such that the protocol data unit is subsequently directed towards the new address. For example, in case of a network-layer protocol, this means that packets of that network-layer protocol may be re-labeled with a network address representing a different network-layer resource (e.g. networking device), which is known as Network Address Translation (NAT). Similarly, in case of an application-layer protocol, messages of that application-layer protocol may be re-labeled with an address representing a different application-layer resource (e.g. web content in case of a web protocol).

For example, traffic addressed to the original private address space is routed directly within a copied data center (internal traffic). Traffic addressed to a new public address space is routed directly within a copied data center (internal traffic) or is routed directly to a copied data center (external traffic). Traffic addressed to the original public address space can be re-addressed—i.e. network address translated (see below)—automatically, and then routed directly within the copied data center (internal traffic), whereas special handling is only required for the remaining traffic (external traffic).

In an embodiment, the original public address space includes an original public IP address space.

In a further embodiment, the new public address space includes a new public IP address space.

Advantageously, the introduction of IP addresses generalizes the proposed method to network-layer address spaces and address translation in IP networks which may be considered the most practical and relevant implementation of network addressing embracing the concept of public/private address spaces.

In a further embodiment, the address translation component is provided such that it is configured, for traffic within one certain of the copied data centers, to translate an address of the original public address space into a corresponding address of the new public address space allocated to the certain copied data center.

Advantageously, the above-described use of NAT minimizes the overall configuration effort for data center duplication, as only minimal reconfiguration is needed for handling traffic directed to addresses of the original public address space within a copied data center. In some implementations, the configuration involves providing a public-to-public address mapping on the NAT devices of the copied data centers. Further, the configuration may be done in preparation or advance of the duplication phase. Moreover, address translation for this class of traffic works automatically once it is configured, i.e. no further user interaction or contribution is required.

Particularly, address translation here may refer to re-addressing of traffic, directed to an address of a public address space (assigned to the data center, but occurring in the copied data center), with a corresponding address of another public address space (assigned to the copied data center).

In a further embodiment, the address translation component is provided such that it is configured, for traffic from a source copied data center to a destination copied data center, to translate an address of the original private address space into a corresponding address of the original private address space allocated to the destination copied data center using alias private addresses.

Advantageously, the above-described use of NAT minimizes the configuration effort for data center duplication further, as only minimal reconfiguration is needed for traffic to be directed to addresses of the private address space within another copied data center. In some implementations, the configuration involves providing the alias-to-private address mapping on the NAT devices of the copied data centers. Further, the configuration may be done in preparation or advance of the duplication phase. Furthermore, address translation for this class of traffic works automatically once it is configured, i.e. no further user interaction or contribution is required.

Particularly, a source may refer to a communication endpoint which employs a communication protocol (e.g. IP protocol) and sends or addresses traffic to a destination. Similarly, a destination may refer to a communication endpoint which employs a communication protocol (e.g. IP protocol) and receives traffic sent from a source and addressed to this destination. The communication endpoints may also swap roles during a communication session.

In particular, address translation here may refer to re-addressing of traffic, directed to an address of a private address space (assigned to the data center, and re-used in all copied data centers), with a corresponding address of an alias private address space (assigned to one certain of the copied data centers). Traffic re-addressed in such a way may be discriminated from internal traffic of the copied data center, routed to the other copied data center, re-addressed to a corresponding address of the private address space, and delivered.

Moreover, the physical machines that comprise the data center site may be re-used in one of the copied data center sites. This implies that some communication between the copied data center sites may be required to copy the server configuration and data to the site that is using new hardware, where some of the servers may only have private addresses. For this purpose, NAT may be used on the address translation component to allow an explicit transfer between servers that are reachable via the same private address in the two sites, but prevent accidental references.

For example, this may be achieved by assigning a different unused private address range to each of the copied data centers, which serves as an alias address range for the respective copied data center and enables to distinguish and approach the different copied data centers that are otherwise undistinguishable. Traffic using alias addresses may be routed to the address translation component, there be translated to the private address space that is common to all copied data centers, and then be routed to the copied data center whose alias address space was used.

For example, if corporate internal traffic uses the private address spaces 10.1.0.0/16 and 10.2.0.0/16 in each of the copied data centers, then traffic sent to addresses of these address spaces would never leave a copied data center. Mapping unused private address spaces like 10.101.0.0/16 and 10.102.0.0/16 in one copied data center as alias for the other copied data center, as well as 10.201.0.0/16 and 10.202.0.0/16 in the other copied data center as an alias for the one copied data center, then copied data centers may send traffic to each other ending up in the private address space.

In a further embodiment, the original public address space includes an original DNS namespace.

In a further embodiment, the new public address space includes a new DNS namespace.

Advantageously, the use of the DNS enables introduction of names for resources (networking devices, web content, etc.) which are easier to remember than their corresponding numeric addresses.

For example, a particular communication network—e.g., a data center—is identified by a DNS namespace like orig.co.uk, a particular networking device is identified by a combination of DNS namespace and DNS name of a networking device—e.g., www.orig.co.uk, and a particular web content is identified by the combination of DNS namespace to identify the network containing the web server, DNS name to identify the web server providing the particular web content as well as path information to identify the particular content on that web server, collectively forming an application-layer address which is also known as Uniform Resource Locator (URL)—e.g. www.orig.co.uk/path.html.

Advantageously, the use of the DNS further enables the proposed method to also apply to application-layer address spaces and address translation, e.g. for web traffic exchanged between web clients and web servers.

Advantageously, the use of the DNS furthermore minimizes the overall configuration effort for data center duplication, as only minimal reconfiguration is needed for traffic directed to human-readable domain names corresponding to the new public address spaces (assigned to the copied data centers). In some implementations, the configuration involves registration of new namespaces with an arbitrary DNS server serving the data center and/or the copied data centers. Moreover, configuration may be done in preparation or advance of the duplication phase. In addition, DNS service works automatically once it is configured, i.e. no further user interaction or contribution is required.

The Domain Name System (DNS) is a service which associates various information pertaining to a network domain with a corresponding domain name ("DNS namespace").

For example, a domain name may be a component of a name of a networking device, as well as a component of a Uniform Resource Locator (URL, described below) used on the application layer to access web content.

In particular, the DNS may translate names of the networking devices within a network domain to their corresponding numerical network addresses. Depending on its configuration, a DNS service may provide numerical addresses from public and/or private address spaces.

According to some implementations, after data center duplication, the data center's DNS server may continue to be the authoritative name server for the original DNS namespace, and each of the copied data centers may have a new DNS server that is the authoritative name server for their new namespaces. Because the facilities in the copied data centers can be independent, the private address space can be re-used without changes. If the data center's DNS server resolves these private addresses, then the copied data centers' DNS servers can be configured as slave servers to the original DNS namespace, i.e. for those DNS names that are resolved to private addresses.

Particularly, web clients deploy a web protocol (e.g. HTTP) to request web content from a web server, and can be realized as a web browser, web script etc. Web servers, in contrast, deploy the web protocol to answer requests for web content issued by web clients. Both web clients and web servers represent endpoints of the protocol exchange.

In a further embodiment, the address translation component is provided such that it is configured, for web traffic directed to the data center, to translate an address of the original public address space to a further address within the original public address space by means of URL switching and/or URL redirection.

Advantageously, the above-described use of URL switching and/or URL redirection minimizes the overall configuration effort for data center duplication, since only minimal reconfiguration is needed for web traffic directed to addresses of the original public address space which was assigned to the data center, but is still in use in the copied data centers and in external networks as well. In some implementations, the configuration involves a catch-all redirection of web traffic addressed to the data center's web server, either on this web server or on an upstream web switch. Further, configuration may be done in preparation/ advance of the duplication phase. Moreover, address translation for this class of traffic works automatically once it is configured, i.e. no further user interaction or contribution is required.

In some implementations, URL switching may stand for the capability to re-address requests for web content (as specified by a URL included in the web request) to a different URL, potentially involving different web content and/or web server, based on the URL embedded in the web request. URL redirection not only re-addresses the request but also answers the request with a redirection message, which effectively notifies the requesting web client of the address translation and enables it to initiate a request for web content as specified by the new URL. Both URL switching and URL redirection may be performed by an intermediate device capable of intercepting and manipulating web traffic exchanged between web clients and a web server (e.g. web switch, also known as content switch, application switch or layer-7 switch), and/or an end device (e.g. web server) capable of the protocol used for exchanging web traffic (e.g. HTTP).

For example, URL switching and/or URL redirection may be used to catch all web traffic that is (still) directed to the data center's web server in order to initiate its redirection to a single, predetermined URL also served by the data center's web server, which may in turn provide web content described further below.

In a further embodiment, the method includes providing a web content to a requesting web client at the further address within the original public address space. The provided web content is configured to enforce a user selection by the requesting web client to select one certain of the copied data centers.

Advantageously, the above-described user selection minimizes the overall configuration effort for data center duplication, as only minimal reconfiguration is needed to effectively establish a simple self-service for all users accessing web content on the data center's web server, i.e. configuration work is effectively outsourced to the users of the data center. Further, configuration may be done in preparation or advance of the duplication phase.

Particularly, the web content delivered by the web server of the data center may be configured to enforce a user selection via the requesting web client. This user selection may involve a choice of the copied data center responsible for answering future requests for web content by the particular web client, i.e. user.

In a further embodiment, the provided web content is configured to execute a program in the requesting web client for setting a cookie which is adapted to identify the new DNS namespace of the certain copied data center based on the user selection.

Advantageously, the cookie is used to memorize the above-described user selection, i.e. the user is prompted only once at the beginning of a session, which is a more practical way of handling ambiguous requests for web content instead of enforcing user selections over and over again for each and every request sent to a web server. In doing so, a program must be executed by the requesting web client since the user selection is made at the web client, and not at the web server which would otherwise be capable of setting cookies, too. For example, the program implementing the user selection may be a web script etc.

Advantageously, the cookie is furthermore attached to future requests for web content to the issuing web server, and paves the way for cookie switching and/or cookie redirection described below.

Advantageously, the above-described use of cookies minimizes the overall configuration effort for data center duplication, as setting cookies works automatically once the executable program is provided as part of the above-described web content, i.e. no further user interaction or contribution is required.

According to some implementations, the present cookie may be a piece of information used by an issuer to identify a particular user and/or user session, and may be passed back to the issuer as long as the cookie exists. This means that cookies may persist much longer than a single request-response message exchange between protocol endpoints. In a data center duplication context, the cookie may be issued by the data center's web server to unambiguously identify a particular web client during a session involving multiple request-response message exchanges between the web server and the particular web client.

In addition to setting the cookie, the provided web content might also update the link (i.e. URL) to which the request will be sent after the user selection, i.e. provide a direct reference. The web content may also try to set a cookie to be sent to the web server of the selected copied data center, in case no referer information (e.g. HTTP Referer) is set. The web servers at the copied data centers may look at the referer information (not set by all browsers). If traffic was received via a browser redirect, a banner may be used to suggest updating the bookmark or link.

In a further embodiment, the address translation component is provided such that it is configured, for traffic directed to the data center, to translate an address of the original public address space to a corresponding address of the new public address space allocated to one of the copied data centers by means of cookie switching and/or cookie redirection.

Advantageously, the above-described use of cookie switching and/or cookie redirection minimizes the overall configuration effort for data center duplication, as only minimal reconfiguration is needed for redirection of individual users' web traffic which is (still) directed to addresses of the original public address space which was assigned to the data center, but is in use in the copied data centers and in external networks as well. Furthermore, configuration may be done in preparation or advance of the duplication phase, involving the data center's web server and/or a web switch in the data center, located upstream of the web server. Moreover, address translation for this class of traffic works automatically once it is configured, i.e. no user further interaction or contribution is required.

In some implementations, cookie switching may represent the capability to re-address requests for web content (as specified by a URL included in the web request) to a different URL, potentially involving different web content and/or web server, based on a cookie embedded in the web request. Cookie redirection not only re-addresses the request but also answers the request with a redirection message, which effectively notifies the requesting web client of the address translation and enables it to initiate a request for web content as specified by the new URL. Both cookie switching and cookie redirection may be performed by an intermediate device (e.g. web switch) and/or an end device (e.g. web server) capable of the protocol used for exchanging web traffic (e.g. HTTP).

In a further embodiment, cookie switching uses a cookie being adapted to identify the new DNS namespace substituting the original DNS namespace for the web traffic to be re-addressed.

In a further embodiment, cookie redirection uses a cookie being adapted to identify the new DNS namespace substituting the original DNS namespace for the web traffic to be re-addressed.

Advantageously, by setting the cookie such that it is representative for a particular copied data center determined by the user selection, more than one (i.e. a plurality of) copied data centers can be distinguished, and every user may select the correct copied data center individually.

In a further embodiment, the method includes providing a skeleton data center acting as proxy for the data center. The provided skeleton data center includes at least a web server.

Advantageously, it is possible to devise a synergetic configuration integrating the features of the skeleton data center into one of the copied data centers, so that existing data center infrastructure may be re-used or shared.

In particular, the term 'skeleton' refers to a minimal set of features required for seamless web service during the phase of data center duplication and beyond. The web server is a mandatory feature, because it serves as a safe landing point for traffic (still) directed to original addresses right from the start of duplication, which in turn enables logging and/or localization of remaining misconfigurations, as well as permanent traffic hand-off to the copied data centers. Moreover, the web server functionality may be provided by an appliance. That is to say that a load balancer may be able to act as web server for traffic to the old addresses by automatically serving the "where do you want to be redirected" page itself. Further, this may be in addition to content-switched redirection of traffic to the old addresses when a cookie is present.

In a further embodiment, the address translation component is provided such that it includes a first entity integrated in the web switch and a second entity integrated in the web server. Each of the first entity and the second entity is adapted to execute the cookie redirection, the cookie switching, the URL redirection and/or the URL switching.

Advantageously, cookie redirection, cookie switching, URL redirection and/or URL switching can be performed by the web switch, the web server, or a combination of both, enabling an implementation tailored to specific scenarios. In some implementations, a web server may only be responsible for answering requests for web content, whereas in other implementations, it may even be required to perform URL redirection and/or cookie redirection as well.

Particularly, the web switch directs external web traffic with original public addresses and without an attached cookie to the web server in the skeleton data center, which lets the user determine the correct one of the copied data centers and sets the cookie to store this information, while it immediately redirects external web traffic with original addresses and the attached cookie to the correct one of the copied data centers.

According to some implementations, a data center may provide the following services: a routing service (for ingress, egress, and internal traffic), a firewall service (for ingress traffic), a network address translation (NAT) service (for ingress, egress and internal traffic), a domain name service (DNS), a web service (involving one or more web servers), a web switching service (involving one or more web switches) and a compute service (involving the computing resources, i.e. arrays of servers).

According to some implementations, the firewall configuration at each copied data center may be exactly the same as the firewall configuration at the data center, except with the public addresses translated to the copied data center's public address space, and any rules referencing the DNS name rather than the numeric address updated to the copied data center's DNS namespace. By using network address translation (NAT) to forward traffic only for servers permitted to receive connections from the Internet, an address translation component may act as a de-facto firewall for these flows.

According to some implementations, a copied data center may provide the same services as a data center, but the compute service of the data center is very likely to be re-used in one of the copied data centers, thus turning the data center into a skeleton data center.

According to some implementations, a single NAT service may be provided for the data center and the copied data centers, or a duplicated NAT service per copied data center, which can keep the traffic local to each copied data center and improves any potential latency issues. In the latter case of a duplicated NAT service, the NAT service for the (skeleton) data center may be provided by a NAT service provided for one of the copied data centers.

Any embodiment of the first aspect may be combined with any embodiment of the first aspect to obtain another embodiment of the first aspect.

According to a second aspect, the invention relates to a computer program comprising a program code for executing the method of the first aspect for duplicating a data center having an original public address space and an original private address space when run on at least one computer.

According to a third aspect, a device for duplicating a data center having an original public address space and an original private address space is proposed. The device includes a copying entity, an allocating entity, and a providing entity. The copying entity is configured to copy the data center such that at least two copied data centers are provided. The allocating entity is configured to allocate, to each of the copied data centers, a new public address space and the original private address space of the data center. The providing entity is configured to provide an address translation component which is configured to re-address traffic such that traffic directed to an address of the original public address space is directed to a corresponding address of one of the new public address spaces of the copied data centers.

The respective entity, e.g. the copying entity, the allocating entity, and the providing entity, may be implemented in hardware and/or in software. If said entity is implemented in hardware, it may be embodied as a device, e.g. as a computer or as a processor or as a part of a system, e.g. a computer system. If said entity is implemented in software it may be embodied as a computer program product, as a function, as a routine, as a program code or as an executable object.

According to a fourth aspect, a system for substituting a data center having an original public address space and an original private address space is proposed. The system includes at least two copied data centers, wherein each of the copied data centers has a new public address space and the original private address space of the data center. Moreover, the system includes an address translation component which is configured to re-address traffic such that traffic directed to an address of the original public address space is directed to a corresponding address of one of the new public address spaces of the copied data centers.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

Figure 1:
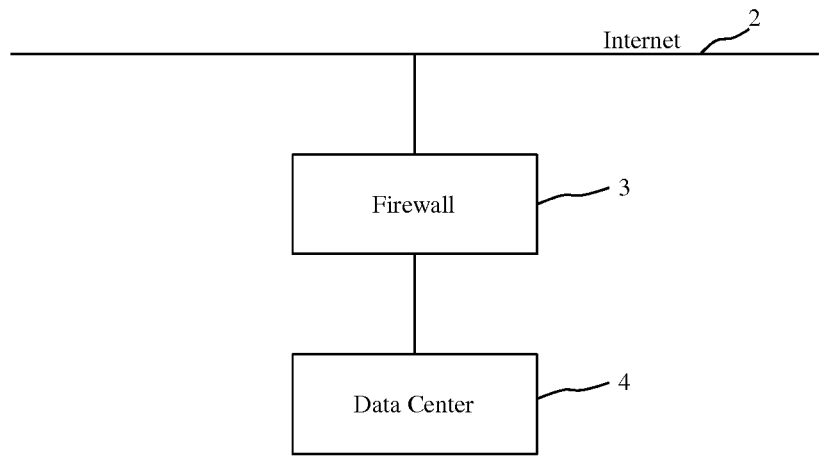
FIG. 1 shows a schematic block diagram of data center coupled to a network.

In the following, embodiments for duplicating a data center 1 having an original public address space and an original private address space are shown. In this regard, FIG. 1 shows a data center 1 that has to be duplicated into a number of copied data centers 11, 12. Embodiments for copied data centers 11, 12 are described with referenced FIGS. 3 to 5.

The data center 1 which has to be copied or duplicated may be coupled to a network, like the internet 2, by means of a firewall 3.

Figure 2:
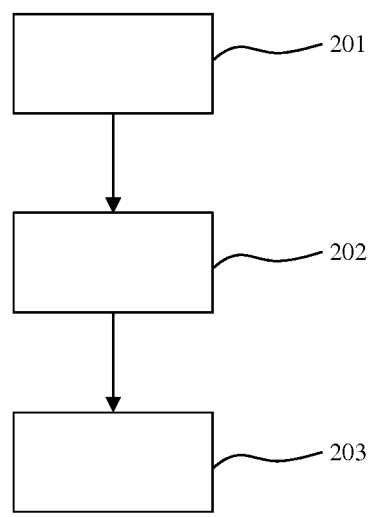
FIG. 2 shows an embodiment of a sequence of method steps for duplicating a data center.
Figure 3:
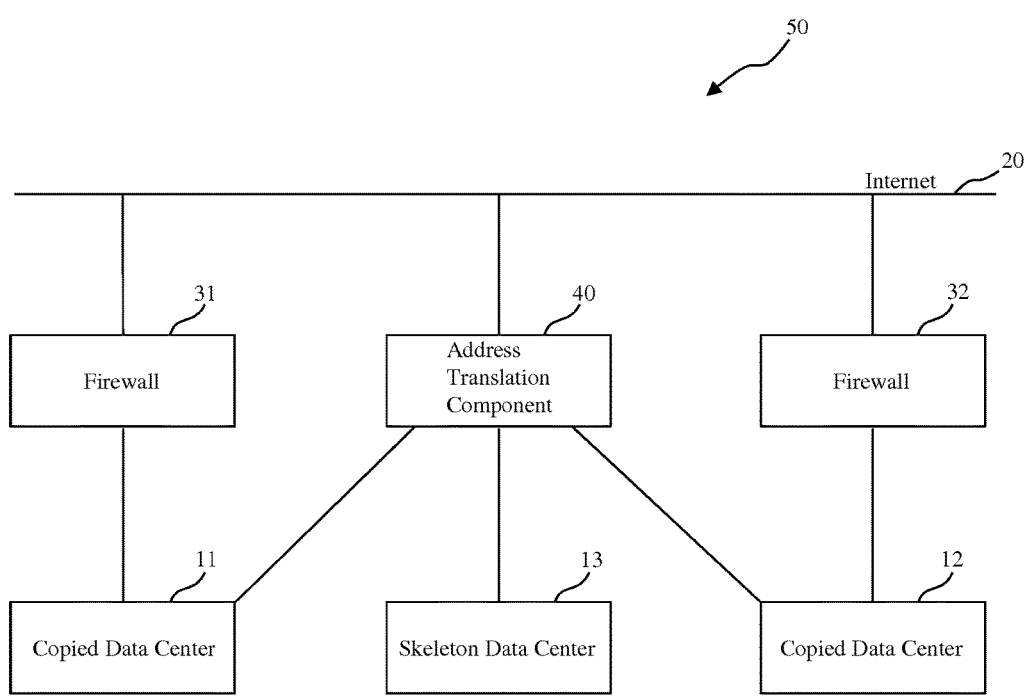
FIG. 3 shows a schematic block diagram of a first embodiment of a system including two copied data centers.
Figure 4:
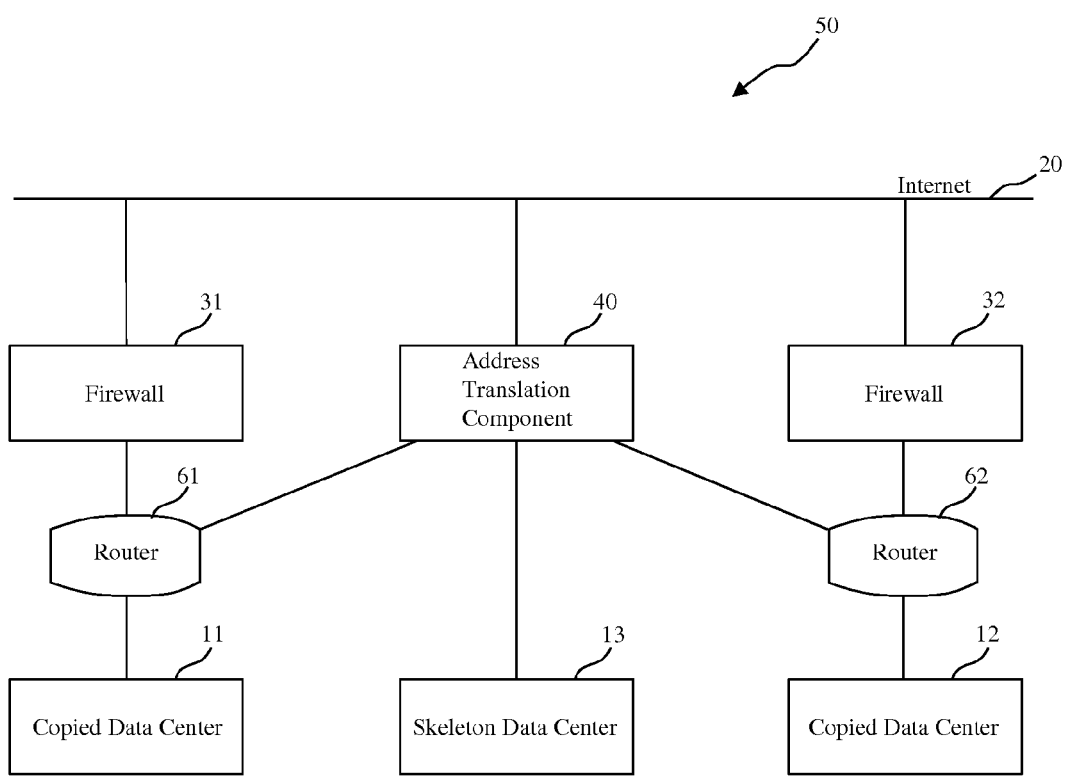
FIG. 4 shows a schematic block diagram of a second embodiment of a system including two copied data centers.
Figure 5:
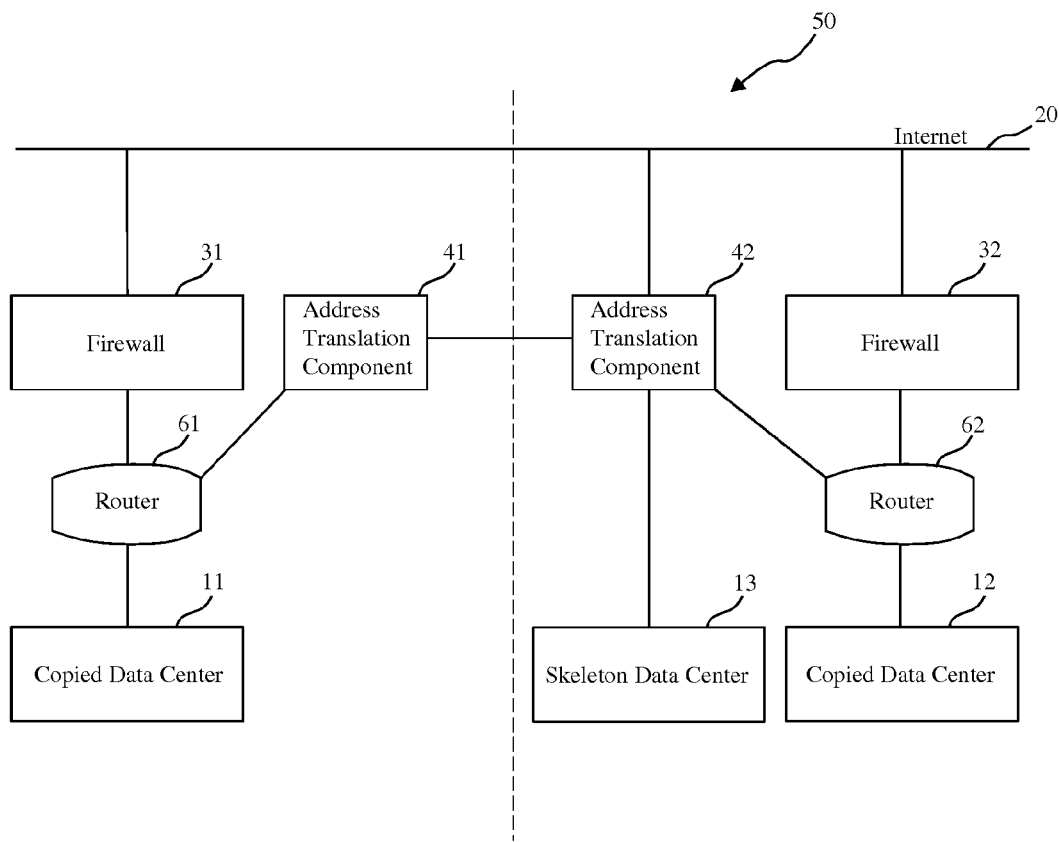
FIG. 5 shows a schematic block diagram of a third embodiment of a system including two copied data centers.

FIG. 2 shows an embodiment of a sequence of method steps for duplicating the data center 1 of FIG. 1 into two copied data centers 11, 12. The result of duplicating the data center 1 into a number of copied data centers 11, 12 may be a system 50 as shown in FIGS. 3 to 5. Without loss of generality, FIGS. 3 to 5 show only two copied data centers 11, 12. In general, the data center 1 of FIG. 1 may be duplicated by the method of FIG. 2 into a plurality N of copied data centers 11, 12, with N≥2.

The method of FIG. 2 has the following method steps 201, 202, 203:

In step 201, the data center 1 is copied so that two copied data centers 11, 12 (see FIGS. 3 to 5) are provided.

In step 202, a new public address and the original private address space of the data center 1 are allocated to each of the copied data centers 11, 12. In other words, each copied data center 11, 12 has a new public address space and the original private address space. In particular, the new public address spaces of the two copied data centers 11, 12 are different to each other.

For example, the original public address space includes an original public IP address space. In this example, the new public address space includes a new public IP address space. Further, the original public address space may include an original DNS namespace. As a consequence, the new public address space may include a new DNS namespace.

In step 203, an address translation component 40 (see FIGS. 3 to 5) is provided. The address translation component 40 is configured to re-address traffic such that traffic directed to an address of the original public address space is directed to a corresponding address of one of the new public address spaces of the copied data centers 11, 12. In other words, if the address translation component 40 receives traffic, for example a data packet, which is directed to an address of the original public address space of the data center 1, it decides to re-address the address of the original public address space to a new address of the new public address space the traffic has to be directed. In this regard, the address translation component 40 decides on the destination copied data center 11, 12.

For traffic within one certain copied data center 11 (so-called Intra DC), e.g. the copied data center 11, the address translation component 40 is provided such it is configured to translate an address of the original public address space into a corresponding address of the new public address space allocated to the certain copied data center 11.

According to a further example, for traffic from a source copied data center, e.g. the copied data center 11 of FIGS. 3 to 5, to a destination copied data center, e.g. the copied data center 12 in FIGS. 3 to 5 (so-called Inter DC), the address translation component 40 is provided such that it is configured to translate the address of the original private address space into a corresponding address of the original private address space allocated to the destination copied data center 12 using alias private addresses. In this regard, the address translation component 40 may include a network address translator (NAT) for translating the private addresses using said alias private addresses.

For web traffic directed to the (original) data center 1, the address translation component 40 may be provided such that it is configured to translate an address of the original public address space to a further address within the original public address space by means of URL switching and URL redirection. In this regard, a web content may be provided to a web client requesting said address of the original public address space at said further address within the original public address space. The provided web content may be configured to enforce a user selection by the requesting web client to select one of the copied data centers 11, 12. As a result, the user of the web client has the ability to select the one copied data center 11 or the other copied data center 12.

Moreover, for traffic directed to the data center 1, e.g. web traffic or traffic from one of the copied data centers 11, 12, the address translation component 40 may be provided such that it is configured to translate an address of the original public address space to a corresponding address of the new public address space allocated to one of the copied data centers 11, 12 by means of cookie switching and/or cookie redirecting. In this regard, both cookie switching and cookie redirection may use a cookie which is adapted to identify the new DNS namespace substituting the original DNS namespace for the traffic to be re-addressed.

Furthermore, said step 203 may include a sub-step of providing a skeleton data center 13 (see FIGS. 3 to 5) substituting the original data center 1. The provided skeleton data center 13 may include at least a web server.

In this embodiment, the address translation component 40 may be provided such that it includes a first entity integrated in the web switch and a second entity integrated in the web server. Both said first entity and said second entity may be adapted to execute the cookie redirection, the cookie switching, the URL redirection and the URL switching.

FIGS. 3-5 depict schematic block diagrams of a system 50 for substituting a data center 1 having an original public address space and an original private address space.

All embodiments of such a system 50 shown in FIGS. 3-5 have in common that they include copied data centers 11, 12, each of which having a new public address space and the original private address space of the data center 1. A topological aspect is that routing between the copied data centers 11, 12 is direct, not over the Internet, so that the privacy of internal traffic is preserved. The exact topology may likely depend on physical constraints.

The system 50 shown in FIG. 3 includes the copied data centers 11, 12, a skeleton data center 13 substituting the data center 1, and an address translation component 40. The copied data centers 11, 12 are coupled to a network, like the internet 20, by means of firewalls 31, 32. The address translation component 40 is also coupled to a network, like the internet 20, and attached to the copied data centers 11, 12 as well as to the skeleton data center 13. The address translation component 40 is configured to re-address traffic such that traffic directed to an address of the original public address space is directed to a corresponding address of one of the new public address spaces of the copied data centers 11, 12.

The system 50 depicted in FIG. 4 includes the copied data centers 11, 12, a skeleton data center 13 substituting the data center 1, an address translation component 40, and routers 61, 62. The copied data centers 11, 12 are coupled to a network, like the internet 20, and by means of firewalls 31, 32, and via these routers 61, 62. The address translation component 40 is also coupled to a network, like the internet 20, and connects via the routers 61, 62, to the copied data centers 11, 12, as well as directly to the skeleton data center 13. The address translation component 40 is configured to re-address traffic such that traffic directed to an address of the original public address space is directed to a corresponding address of one of the new public address spaces of the copied data centers 11, 12.

Particularly, if physical constraints mandate the co-location of the address translation component 40 with one of the copied data centers 11, 12, then the other of the copied data centers 11, 12 is likely to experience higher delays for local traffic. Duplicating the address translation component 40 can keep the re-addressed traffic local to each location, and reduce delays.

This is embraced by the embodiment of system 50 depicted in FIG. 5, which includes the copied data centers 11, 12, a skeleton data center 13 substituting the data center 1, a number of address translation components 41, 42 corresponding to the number of copied data centers 11, 12, and routers 61, 62. The copied data centers 11, 12 are coupled to a network, like the internet 20, via these routers 61, 62, and by means of firewalls 31, 32. The address translation components 41, 42 are connected to each other, have at least one connection to a network, like the internet 20, and at least one connection to the skeleton data center 13. Moreover, each address translation component 41, 42 is coupled, via the routers 61, 62, to a copied data center 11, 12. The address translation components 41, 42 are configured to re-address traffic such that traffic directed to an address of the original public address space is directed to a corresponding address of one of the new public address spaces of the copied data centers 11, 12.

Figure 6:
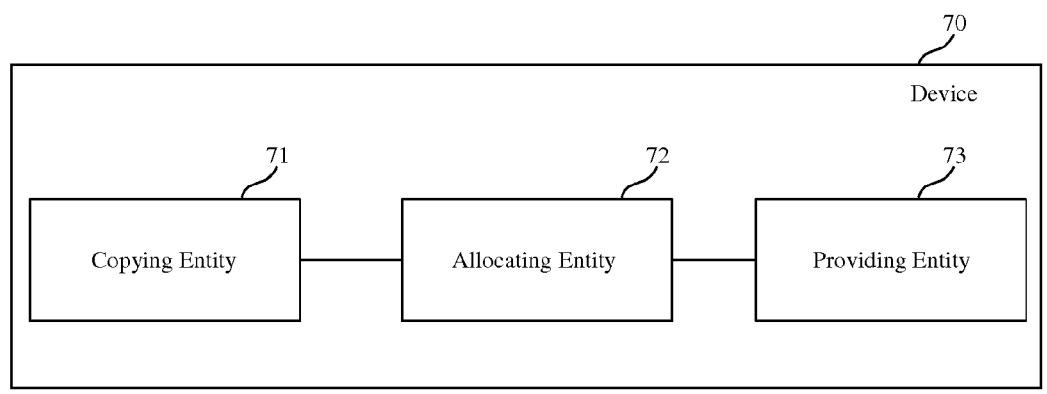
FIG. 6 shows a schematic block diagram of an embodiment of a device for duplicating a data center.

In FIG. 6, a device 70 for duplicating a data center 1 having an original public address space and an original private address space is detected. The device 70 of FIG. 6 comprises a copying entity 71, an allocating entity 72, and a providing entity 73.

The copying entity 71 is adapted to copy the data center 1 such that at least two copied data centers 11, 12 are provided.

The allocating entity 72 is adapted to allocate, to each of the copied data centers 11, 12, a new public address space and the original private address space of the data center 1.

Moreover, the providing entity 73 is adapted to provide an address translation component 40. The address translation component 40 is configured to re-address traffic such that traffic directed to an address of the original public address space is directed to a corresponding address of one of the new public address spaces of the copied data centers 11, 12.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 2 may be implemented in software, as an executable program, the latter executed by suitable digital processing devices. More generally, embodiments of the present invention may be implemented wherein general-purpose digital computers, such as personal computers, workstations, etc., are used.

Figure 7:
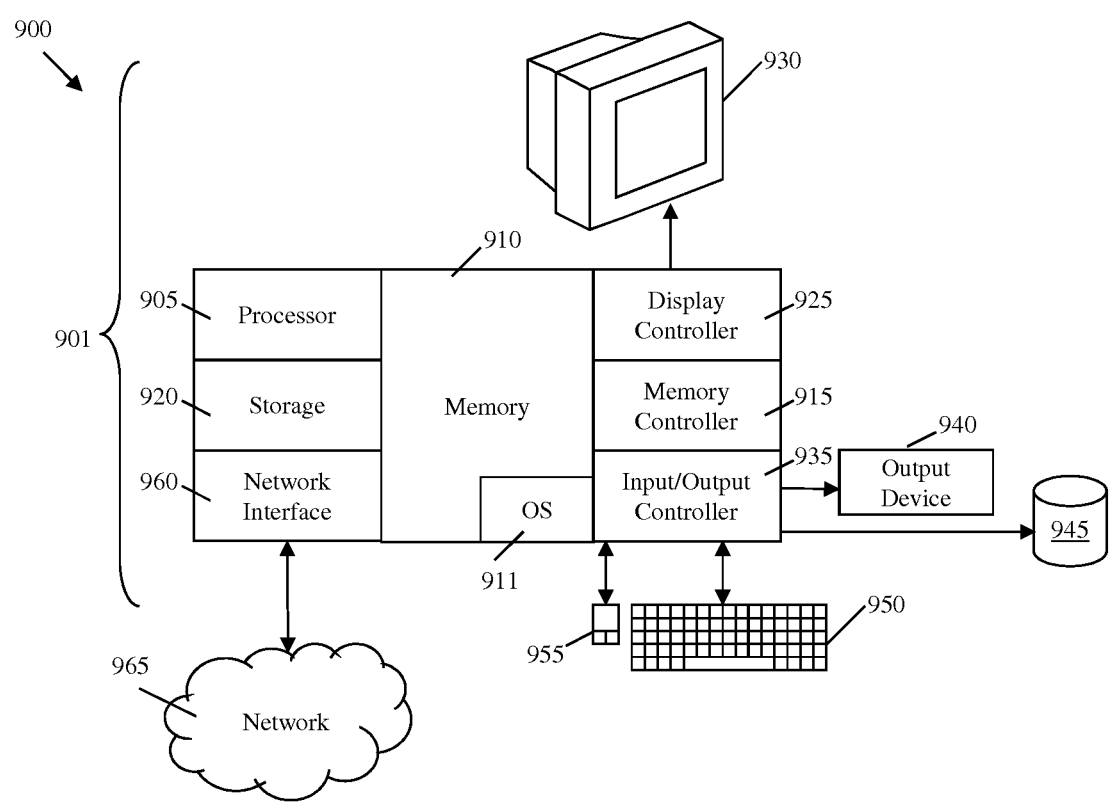
FIG. 7 shows a schematic block diagram of an embodiment of a system adapted for performing the method for duplicating a data center.

For instance, the system 900 depicted in FIG. 7 schematically represents a computerized unit 901, e.g., a general-purpose computer. In exemplary embodiments, in terms of hardware architecture, as shown in FIG. 7, the unit 901 includes a processor 905, memory 910 coupled to a memory controller 915, and one or more input and/or output (I/O) devices 940, 945, 950, 955 (or peripherals) that are communicatively coupled via a local input/output controller 935. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 7, the software in the memory 910 includes methods described herein in accordance with exemplary embodiments and a suitable operating system (OS) 911. The OS 911 essentially controls the execution of other computer programs, such as the methods as described herein (e.g., FIG. 2), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g. with reference to FIG. 2 are implemented in software, the methods may be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE NUMERALS

1 data center
2 network, e.g. internet
3 firewall
11 copied data center
12 copied data center
20 network, e.g. internet
31 firewall
32 firewall
40 address translation component
41 address translation component
42 address translation component
50 system
61 rooter
62 rooter
70 device
71 copying entity
72 allocating entity
73 providing entity
201-203 method step

The invention claimed is:

1. A method for duplicating a data center computer having an allocated original public address space of contiguous public network address locations and an original private address space of contiguous private network address locations, the method comprising:

copying, using a hardware processor, configuration state data of the data center computer to at least a first copied data center computer and a second copied data center computer for providing at least two copied data centers;

to each of the first and second copied data centers computers, allocating, using a hardware processor, a new public address space of contiguous public network address locations and the original private address space of contiguous private network address locations of the data center computer, and receiving, at a proxy web server device associated with the data center computer, during said duplicating, packets associated with network communications traffic;

translating, at the hardware processor configured to perform network address translation, an address of the received network communications traffic packets for re-addressing said received network communications traffic such that traffic directed to an address of the original public address space is directed to a corresponding address of one of the allocated new public address spaces of the first and second copied data center computers, wherein the original public address space includes an original DNS namespace, and wherein the new public address space includes a new DNS namespace, and for web traffic directed to the data center, translating, at said hardware processor performing network address translation, an address of the original public address space to a further address within the original public address space by means of URL switching and/or URL redirection;

providing, by said proxy web server, a web content to a requesting web client at the further address within the original public address space, wherein the provided web content is configured to enforce a user selection by the requesting web client to select one certain of the copied data centers; and wherein the provided web content is configured to execute a program in the requesting web client for setting a cookie which is adapted to identify the new DNS namespace of the certain copied data center based on the user selection.

2. The method of claim 1, wherein the original public address space includes an original public IP address space, and wherein the new public address space includes a new public IP address space.

3. The method of claim 1, wherein for traffic within one certain of the copied data centers, translating, at said hardware processor performing network address translation, an address of the original public address space into a corresponding address of the new public address space allocated to the certain copied data center.

4. The method of claim 1, wherein for traffic from a source copied data center to a destination copied data center, translating, at said hardware processor performing network address translation, an address of the original private address space into a corresponding address of the original private address space allocated to the destination copied data center using alias private addresses.

5. The method of claim 1, wherein for traffic directed to the data center, translating, at the processor device performing network address translation, an address of the original public address space to a corresponding address of the new public address space allocated to one of the copied data centers by means of cookie switching and/or cookie redirection.

6. The method of claim 5, wherein cookie switching uses a cookie being adapted to identify the new DNS namespace substituting the original DNS namespace for the traffic to be re-addressed.

7. The method of claim 5, wherein cookie redirection uses a cookie being adapted to identify the new DNS namespace substituting the original DNS namespace for the web traffic to be re-addressed.

8. The method of claim 1, wherein the processor device performing network address translation includes: address translation component (40) is provided such that it includes a first processor device entity integrated in a web switch for performing network address translation and a second processor device entity integrated in the web server for performing network address translation, wherein each of the first entity and the second entity is adapted to execute the cookie redirection, the cookie switching, the URL redirection and/or the URL switching.

9. A device for duplicating a data center computer having an allocated original public address space of contiguous public network address locations and an original private address space of contiguous network private address locations, the device comprising:

a memory storage device, a hardware processor operatively coupled to said memory storage device and configured to:

copy configuration state data of the data center to at least a first copied data center computer and a second copied data center computer such that at least two copied data centers are provided, allocate, to each of the first and second copied data centers, a new public address space of contiguous public network address locations and the original private address space of contiguous private network address locations of the data center computer, and receive, at a proxy web server device associated with the data center computer, during said duplicating, packets associated with network communications traffic;

translate an address of the received network communications traffic packets to re-address said received network communications traffic such that traffic directed to an address of the original public address space is directed to a corresponding address of one of the allocated new public address spaces of the first and second copied data center computers, and wherein the original public address space includes an original DNS namespace, and wherein the new public address space includes a new DNS namespace, and for web traffic directed to the data center, said hardware processor is further configured to:

translate an address of the original public address space to a further address within the original public address space by means of URL switching and/or URL redirection;

provide by a proxy web server, a web content to a requesting web client at the further address within the original public address space, wherein the provided web content is configured to enforce a user selection by the requesting web client to select one certain of the copied data centers; and wherein the provided web content is configured to execute a program in the requesting web client for setting a cookie which is adapted to identify the new DNS namespace of the certain copied data center based on the user selection.

10. A system for substituting a data center computer having an allocated original public address space of contiguous public network address locations and an original private address space of contiguous private network address locations, the system comprising:

a memory storage device, a hardware processor operatively coupled to said memory storage device and configured to:

copy configuration state data of the data center to at least a first copied data center computer and a second copied data center computer such that at least two copied data centers are provided, wherein each of the copied data centers has a new public address space of contiguous public network address locations and the original private address space of contiguous private network address locations of the data center computer, and receive, at a proxy web server device associated with the data center computer, during said duplicating, packets associated with network communications traffic;

translate an address of received network communications traffic packets to re-address said received network communications traffic such that traffic directed to an address of the original public address space is directed to a corresponding address of one of the allocated new public address spaces of the first and second copied data center computers, wherein the original public address space includes an original DNS namespace, and wherein the new public address space includes a new DNS namespace, and for web traffic directed to the data center, configuring said hardware processor to:

translate an address of the original public address space to a further address within the original public address space by means of URL switching and/or URL redirection;

provide by a proxy web server, a web content to a requesting web client at the further address within the original public address space, wherein the provided web content is configured to enforce a user selection by the requesting web client to select one certain of the copied data centers; and wherein the provided web content is configured to execute a program in the requesting web client for setting a cookie which is adapted to identify the new DNS namespace of the certain copied data center based on the user selection.

* * * * *